United States Patent [19]

Kinoshita et al.

[11] 4,208,311

[45] Jun. 17, 1980

[54] AQUEOUS DISPERSION OF URETHANE DIAMINE HAVING STORAGE STABILITY AND COATING COMPOSITION CONTAINING IT

[75] Inventors: Tatsuo Kinoshita, Yamaguchi; Takashi Izumi, Iwakuni, both of Japan

[73] Assignee: Mitsui Petrochemical Industries Ltd., Tokyo, Japan

[21] Appl. No.: 892,779

[22] Filed: Apr. 3, 1978

[30] Foreign Application Priority Data

Apr. 5, 1977 [JP] Japan ................................. 52/38112

[51] Int. Cl.$^2$ ........................ C08J 3/02; C08L 79/00
[52] U.S. Cl. ................... 260/29.2 TN; 260/29.2 EP; 260/37 EP; 525/418; 528/61; 525/453
[58] Field of Search ................... 260/29.2 TN, 37 N; 528/61

[56] References Cited

U.S. PATENT DOCUMENTS

| | | | |
|---|---|---|---|
| 3,479,310 | 11/1969 | Dieterich et al. | 260/29.2 TN |
| 3,499,824 | 3/1970 | Strazdins et al. | 260/29.2 TN |
| 3,672,818 | 6/1972 | Wagner et al. | 260/29.2 TN |

*Primary Examiner*—J. Ziegler
*Attorney, Agent, or Firm*—Sherman & Shalloway

[57] ABSTRACT

An aqueous dispersion having a pH of about 7 to about 10.5 and comprising
 (A) a specific urethane diamine having a molecular weight of about 5,500 to about 25,000,
 (B) about 0.5 to about 20 parts by weight, per 100 parts by weight of the urethane diamine (A), of a polyoxyethylene ether as an emulsifier having a hydrophilic-lipophilic balance (HLB) of about 11 to about 16 and selected from the group consisting of polyoxyethylene aryl ethers and polyoxyethylene lauryl ether,
 (C) about 50 to about 300 parts by weight, per 100 parts by weight of the urethane diamine (A), of water,
 (D) an acid as a pH adjusting agent in an amount sufficient to adjust the pH of the aqueous dispersion to about 7 to about 10.5, and
 (E) a filler in an amount which is within the range of 0 to about 300 parts by weight per 100 parts by weight of the urethane diamine (A) and which does not cause phase separation of the aqueous dispersion.

An aqueous coating composition which will give coatings of high adhesion strength and good weatherability can be prepared from the aqueous urethane diamine dispersion and an aqueous dispersion of a diepoxy compound.

6 Claims, No Drawings

AQUEOUS DISPERSION OF URETHANE DIAMINE HAVING STORAGE STABILITY AND COATING COMPOSITION CONTAINING IT

This invention relates to an aqueous dispersion of a urethane diamine having superior storage stability. The invention also relates to a room temperature-curable coating composition consisting essentially of the aqueous dispersion of a urethane diamine and a minor amount of an aqueous dispersion of a diepoxy compound, which exhibits superior film characteristics typified by high adhesion strength and good weatherability as well as superior coat-ability in such applications as paints, waterproof paints, and adhesives.

The present invention specifically pertains to an aqueous dispersion having a pH value of about 7 to about 10.5 and comprising (A) a urethane diamine having a molecular weight of about 5,500 to about 25,000 and expressed by the formula

wherein R is a residual moiety of a long-chain diol having a molecular weight of about 500 to about 15,000, R' is a divalent hydrocarbon radical, and n is an integer of 1 to 25, (B) about 0.5 to about 20 parts by weight per 100 parts by weight of the urethane diamine (A) of a polyoxyethylene ether as an emulsifier having a hydrophilic-lipophilic balance (HLB) of about 11 to about 16 and selected from the group consisting of polyoxyethylene aryl ethers and polyoxyethylene lauryl ether, (C) about 50 to about 300 parts by weight per 100 parts by weight of the urethane diamine (A) of water, (D) an acid as a pH adjusting agent in an amount sufficient to adjust the pH of the aqueous dispersion to about 7 to about 10.5, and (E) a filler in an amount which is within the range of 0 to about 300 parts by weight per 100 parts by weight of the urethane diamine (A) and which does not cause phase separation of the aqueous dispersion. It also pertains to an aqueous coating composition consisting essentially of [I] the aqueous dispersion of a urethane diamine and [II] an aqueous dispersion of a diepoxy compound.

Urethane diamines (A) of the type represented by the above formula are known, and it is also known that these urethane diamines are useful as intermediates for the production of polyurethane elastomers and as curing agents for epoxy resins (see, for example, U.S. Pat. No. 2,888,439 patented May 26, 1959). Its utilization as an ingredient of a sealant composition is also known (see, for example, U.S. Pat. No. 3,158,586 patented Nov. 24, 1964; U.S. Pat. No. 3,984,370 patented Oct. 5, 1976).

For example, U.S. Pat. No. 3,984,370 cited above suggests a room temperature-curable elastic composition useful for various sealants such as caulk roofing material, floor coating material or ceiling coating material, and has superior elongation at break, peel adhesion strength, thixotropic property, desirable hardness with moderate elasticity and good age-resistance. This U.S. Patent discloses the use of 0 to 10 parts by weight, preferably 0.05 to 10 parts by weight, per 100 parts by weight of the urethane diamine, of a compound selected from the group consisting of water, phenol, phenol derivatives, mono- or poly-hydric aliphatic alcohols, aliphatic polyamines having a molecular weight of 50 to 500 and aliphatic hydroxylamines having a molecular weight of 50 to 500 as a curing promotor for the composition.

As is evident from the use of the composition as a sealant, such a composition is a paste-like composition. Hence, even if water is used as a curing promotor as mentioned above, its amount is at most 10 parts by weight per 100 parts by weight of the urethane diamine. None of these prior suggestions indicate a technical idea of providing an aqueous coating composition in the form of an aqueous dispersion containing the urethane diamine. No coating composition based on such an idea has ever been proposed.

The present inventors have worked extensively in an attempt to develop a coating composition of the aqueous dispersion type containing the urethane diamine which can give coatings having useful properties such as superior adhesion strength and good weatherability of various substrates such as the interior and exterior walls of buildings and the inner walls of tunnels which are made of a wide range of materials, for example mortar, concrete and other similar materials, wooden materials, and metallic materials, and which has far superior coatability than the paste-like coating compositions heretofore suggested. The result at first was unsatisfactory, and it seemed impossible to provide a useful aqueous dispersion of this type because an aqueous dispersion of the urethane diamine having good storage stability was very difficult to form, and any dispersion formed underwent phase separation easily.

However, the present inventors repeated careful investigations about many factors which might affect the stability of such an aqueous dispersion. Unexpectedly, they found that an aqueous dispersion having a pH of about 7 to about 10.5, preferably about 8 to about 10.2, which is composed of the ingredients (A) to (E) mentioned above including the use of a specified emulsifier (B) has superior storage stability.

It has also been found that a combination of the aqueous dispersion of the urethane diamine and an aqueous dispersion of a diepoxy compound makes it possible to provide an aqueous coating composition having superior coatability and being free from the disadvantages in regard to working environment and safety which are associated with coating compositions of organic solvent types, and coatings formed from this coating composition have superior characteristics typified by high adhesion to substrate and good weatherability.

It is an object of this invention therefore to provide an aqueous dispersion of a urethane diamine having superior storage stability.

Another object of this invention is to provide an aqueous coating composition comprising the above aqueous dispersion.

The above and other objects and advantages of the invention will become more apparent from the following description.

The urethane diamine (A) which constitutes the aqueous dispersion of the invention is known, and a method for its preparation is also known. Any urethane diamines corresponding to the above-given formula and having a molecular weight of about 5,500 to about 25,000, preferably about 7,000 to about 20,000, can be used.

The urethane diamine (A) can be derived by a method known per se, for example, from a long-chain diol of the formula HOROH in which R is as defined and a diisocyanate of the formula OCNR'NCO in which R' is as defined above. Examples of preferred R groups in the formula of the diol are residual moieties of polyoxyalkylene glycols, diol derivatives of hydrocarbon polymers or copolymers and polyester diols derived from aliphatic carboxylic acids or their anhydrides and alkylene glycols. Examples of preferred R' groups in the formula of the diisocyanate are divalent hydrocarbon groups selected from the class consisting of $C_2$ to $C_{12}$ alkylene groups, $C_6$ to $C_{14}$ cycloalkylene groups and $C_6$ to $C_{14}$ arylene groups. Of these, the aliphatic groups are especially preferred.

Specific examples of compounds HOROH from which these residual moieties R can be derived are polyether glycols such as polyoxypropylene glycol, an ethylene glycol/propylene glycol copolymer with not more than 20% by weight of an ethylene oxide unit, polyoxybutylene glycol or polyoxypentamethylene glycol; diols of hydrocarbon polymers such as polybutadiene diol, polybutadiene-acrylonitrile diol, polybutadiene-styrene diol, polyisoprene diol and polyisobutylene diol; and long-chain diols composed mainly of aliphatic linkages such as a polyester diol obtained by the copolymerization of an aliphatic dicarboxylic acid or its anhydride with a diol.

Specific examples of compounds OCNR'NCO from which the divalent hydrocarbon radical R' is derived include tolylene diisocyanate, 4,4'-diphenylmethane diisocyanate, dianisidine diisocyanate, meta-xylylene diisocyanate, 1,5-naphthalene diisocyanate, trans-vinylene diisocyanate, hexamethylene diisocyanate, ring-hydrogenated tolylene diisocyanate, ring-hydrogenated 4,4'-diphenylmethane diisocyanate, ring-hydrogenated dianisidine diisocyanate, ring-hydrogenated 1,5-naphthalene diisocyanate, and ring-hydrogenated xylylene diisocyanate.

The residual moiety R of the long-chain diol has a molecular weight of about 500 to about 15,000, preferably about 1,000 to about 12,000. If the molecular weight of R is lower than the specified limit, the desirable elastic properties of the resulting coating are aggravated. If, on the other hand, the molecular weight of R is higher than the specified limit, the resulting diamine also has a high molecular weight and thus retards curing.

The urethane diamine (A) has a molecular weight of about 5,500 to about 25,000, preferably about 7,000 to about 20,000. If the molecular weight is lower than the specified limit, it is difficult to form an aqueous dispersion having satisfactory storage stability. If it is higher than the specified limit, the rate of curing is too slow.

Accordingly, in the formula representing the urethane diamine (A) in the present invention, n can be varied according to the molecular weights of R and R', but must be selected such that the molecular weight of the urethane diamine (A) is within the above-specified range.

The polyoxyethylene ether used as an emulsifier which constitutes the aqueous dispersion of the present invention is a member selected from the group consisting of polyoxyethylene aryl ethers and polyoxyethylene lauryl ether, and preferably has a hydrophilic-lipophilic balance (HLB) of about 11 to about 16, especially about 12.5 to about 15.5. Surface active agents having HLB values within the above-specified range give favorable results in stabilizing the aqueous dispersion of the present invention. As will be shown by Comparative Examples given hereinbelow, the use of similar surface active agents cannot give an aqueous dispersion having satisfactory storage stability, and in the present invention, the use of the above-specified emulsifier (B) is essential.

Specific examples of the emulsifier (B) are polyoxyethylene lauryl ether, polyoxyethylene nonylphenyl ether, polyoxyethylene octylphenyl ether, and polyoxyethylene styrenated phenyl ether. Among these, polyoxyethylene nonylphenyl ether is especially preferred.

The polyoxyethylene ether as an emulsifier is used in an amount of about 0.5 to about 20 parts by weight per 100 parts by weight of the urethane diamine (A). If the amount of the emulsifier is smaller than the specified limit, satisfactory emulsification is impossible, and if it is larger than the specified limit, a reduction in the water resistance of the resulting cured product occurs.

The aqueous dispersion of this invention should of course contain water (C) in an amount sufficient to form the aqueous dispersion. Specifically, it is used in an amount of about 50 to about 300 parts by weight per 100 parts by weight of the urethane diamine (A). If the amount of water is below the specified limit, it is difficult to form the desired oil-in-water (o/w) aqueous dispersion, and the resulting dispersion cannot be mixed uniformly with the aqueous dispersion of a diepoxy compound. Moreover, it retards the curing of the resulting composition. If, on the other hand, the amount of water is larger than the specified limit, the water resistance of the resulting cured product is undesirably reduced.

In order for the aqueous dispersion of this invention to be stable, it should have a pH value of about 7 to about 10.5, preferably about 8 to about 10.2, in addition to meeting the other requirements. If the pH value is outside the specified range, it is impossible to form the desired o/w aqueous dispersion.

Accordingly, in the present invention, it is essential to use an acid as a pH adjusting agent in an amount sufficient to adjust the pH of the aqueous dispersion composed of the ingredients (A) to (F) to values within the above-specified range. The use of mineral acids such as hydrochloric acid or sulfuric acid is preferred, but organic acids such as formic acid, acetic acid, lactic acid and p-toluenesulfonic acid can also be used.

In the aqueous dispersion of this invention, a part of the urethane diamine (A) is considered to form a salt with the acid used as a pH adjusting agent. Accordingly, the amount of the acid can be reduced or the acid can be omitted by using the urethane diamine (A) in the form of such a salt. The "acid (D)" used as a pH adjusting agent in this invention is meant to include acids in such a form. The amount of the salt of the urethane diamine (A) and the acid described above cannot be definitely determined, and may vary according to the types of the urethane diamine and the acid. Generally, 0 to about 95%, particularly about 5 to about 60%, of amino groups possessed by the urethane diamine (A) presumably form such a salt when the pH is within the aforesaid range.

The aqueous dispersion of this invention may further contain the filler (E). The use of the filler is especially useful when preparing an aqueous coating composition consisting essentially of [I] the aqueous dispersion having a pH value of about 7 to about 10.5 composed of (A) to (E) and [II] an aqueous dispersion of a diepoxy compound. The filler frequently gives favorable results in improving elastic properties and age-resistance of coated films prepared from the aqueous coating composition.

Examples of the filler are inorganic fillers such as carbon black, silica, zinc oxide, magnesium oxide, calcium oxide, titanium dioxide, magnesium carbonate, calcium carbonate, barium carbonate, magnesium sulfate, calcium sulfate, barium sulfate, talc, clay, sand, cement, alumina white, perlite, asbestos, diatomaceous earth and glass fibers; and organic fillers such as a styrene-butadiene rubber, natural rubber, polybutadiene rubber, asphalt, tar, petroleum rosin, acrylate or methacrylate polymers or copolymers, phenolic resins, natural wood pulp, synthetic pulps, and wood chips. Such a filler is used preferably in the form of a fine powder or fine fibers.

The filler is used in an amount which does not cause phase separation of the aqueous dispersion of the invention. Since the effect on the stability of the dispersion varies depending upon the type or shape of the filler, it is impossible to determine its amount unequivocally. The maximum allowable amount of a particular filler can be determined easily by performing a preliminary test on the filler. Generally, however, a calcium carbonate powder can be used in an amount of up to about 300 parts by weight per 100 parts by weight of the urethane diamine (A). On the other hand, clay, talc, finely divided silica, titanium oxide, and zinc oxide tend to affect the stability of the aqueous dispersion of urethane diamine (A) even when used in lesser amounts. Accordingly, these fillers should be used in far lesser amounts than the calcium carbonate, or added to an aqueous solution of a diepoxy compound when preparing the aqueous coating composition from [I] the aqueous dispersion of this invention and [II] the aqueous dispersion of a diepoxy compound.

The aqueous dispersion having a pH value of about 7 to about 10.5 composed of ingredients (A) to (E) can be prepared by mixing these ingredients. For example, a predetermined amount of the acid is placed in a zone equipped with a stirrer suitable for stirring low-viscosity solutions, and with stirring, a mixture of the urethane diamine (A) and the polyoxyethylene ether (B) is gradually added, followed if desired by adding the filler. Mixing can be performed at room temperature, and does not particularly require cooling or heating. As required, however, a cooling or heating means may be employed.

The aqueous dispersion having a pH value of about 7 to about 10.5 composed of the ingredients (A) to (E) may further contain (F) a curing accelerator, (G) a viscosity adjusting agent, etc. The amount of such an additive can be varied properly. For example, the amount of the curing accelerator (F) is 0 to about 10 parts by weight per 100 parts by weight of the urethane diamine (A), and the amount of the viscosity adjusting agent (G) is 0 to about 100 parts by weight per 100 parts by weight of the urethane diamine (A).

Examples of the curing accelerator (F) are phenols such as phenol, cresol, resorcinol, hydroquinone, catechol, dimethylaminomethyl phenol and tris(dimethylaminomethyl) phenol, and alcohols such as ethylene glycol, propylene glycol and glycerol. Examples of the viscosity adjusting agent (G) include polyoxyethylene glycol, polyoxypropylene glycol, polyvinylalcohol, epoxidized soybean oil, starch, diethyl phthalate, dibutyl phthalate, dioctyl phthalate, dinonyl phthalate, diisodecyl phthalate, tricresyl phosphate and trioctyl phosphate.

The aqueous dispersion of the invention can be used to provide a useful aqueous coating composition by combining it with an aqueous dispersion of a diepoxy compound. Not only can the coating composition be used as a top coat, but also it can be applied directly to a substrate to increase the adhesion of the substrate to a coating or coatings to be formed on the substrate, or to impart water resistance. The aqueous coating composition of the aqueous dispersion type in accordance with this invention can be used especially advantageously for providing a water-proof coating.

When it is desired to form a water-proof coating on ceilings, walls and floors of buildings or inner walls of tunnels which are made of concrete or mortar or a like material, the coating usually tends to peel off after application unless the surfaces of such materials are maintained sufficiently dry before application. However, the use of the aqueous coating composition of this invention gives a water-proof coating having high adhesion strength with a good coating efficiency even if the substrate is not in the fully dried state. This also brings about the advantage of shortening the period required for the coating operation.

The diepoxy compound which is used to form the aqueous coating composition may be any of aromatic, aliphatic and alicyclic diepoxy compounds. A typical diepoxy compound is the one derived from bisphenol A and epichlorohydrin. Examples of useful diepoxy compounds include a diepoxy compound derived from bisphenol A and β-methylepichlorohydrin, glycidyl ether-type diepoxy compounds such as a polyalkylene glycol diglycidyl ether, glycidyl ester-type diepoxy compounds such as diglycidyl phthalate, and glycidyl ether ester-type diepoxy compounds such as p-hydroxybenzoic acid glycidyl ether ester.

Preferred diepoxy compounds have a molecular weight of about 200 to about 1,000.

In the aqueous coating composition of this invention, the amount of the aqueous dispersion of a diepoxy compound is about 0.8 to about 3 moles, especially about 1 to about 2.5 moles, per mole of the urethane diamine (A) in the aqueous dispersion [I].

The aqueous dispersion of a diepoxy compound used in this invention may further contain components to be described below. It should be understood therefore that the aqueous dispersion of a diepoxy compound as referred to in the present invention is permitted to include such additional ingredients.

For example, the aqueous dispersion of a diepoxy compound to be mixed with the aqueous dispersion of the urethane diamine of the invention can be obtained by mixing 100 parts by weight of the diepoxy compound with stirring at 50° to 70° C. with 0.5 to 30 parts by weight, preferably 1 to 20 parts by weight, of a nonionic surfactant composed of a block copolymer of polyoxypropylene glycol and polyoxyethylene glycol (for example, Nissan Pronon 208, a trademark for a product of Nihon Yushi Kabushiki Kaisha), 0 to 5 parts by weight, preferably 0.2 to 3 parts by weight, of polyvinyl alcohol (for example, KH-17, a trademark for a product of Nihon Gosei Kagaku Kogyo K.K.) as an emulsion stabilizer, and 60 to 200 parts by weight, preferably 70 to 150 parts by weight, of water.

The following Examples illustrate the present invention in more detail.

EXAMPLE 1 AND COMPARATIVE EXAMPLE 1

A flask equipped with three-propeller blades was charged with 100 parts by weight of water and a 0.2 N aqueous solution of HCl as a pH adjuster. A mixture of 100 parts by weight of a urethane diamine having a number average molecular weight of 8,500 (corresponding to the formula given hereinabove in which R is a residue of polyoxypropylene glycol with a molecular weight of 3,000 and R' is a hexamethylene group) and 2 parts by weight of polyoxyethylene nonylphenyl ether of varying HLB values was added. The contents were stirred at a speed of 500 rpm to form an aqueous dispersion. The stability of the aqueous dispersion was examined two days later by observing the state of phase separation. The results are shown in Table 1.

Similar results were obtained when the above procedure was repeated except that a 0.2 N aqueous solution of sulfuric acid was used instead of the 0.2 N HCl aqueous solution.

Table 1

| Runs | HLB of emulsifier | pH of aqueous dispersion | Proportion of HCl salt of urethane diamine (%) | Stability of the aqueous dispersion* |
|---|---|---|---|---|
| Example 1 | 13.0 | 10.5 | 0 | No phase separation |
| | 13.0 | 10.0 | 5 | No phase separation |
| | 13.0 | 9.5 | 10 | No phase separation |
| | 13.0 | 8.9 | 13 | No phase separation |
| | 13.0 | 8.5 | 18 | No phase separation |
| | 13.0 | 8.0 | 45 | No phase separation |
| | 13.0 | 7.0 | 95 | No phase separation |
| | 12.4 | 8.9 | 13 | No phase separation |
| | 14.5 | 8.9 | 13 | |
| Comparative Example 1 | 10.0 | 8.9 | 13 | Phase separation occurred |
| | 18.0 | 8.9 | 13 | Phase separation occured |
| | 13.0 | 6.5 | 100 | Phase separation occured |

EXAMPLE 2

Example 1 was repeated using the same urethane diamine as in Example 1 but having a molecular weight of 6,000, 9,500 or 14,000. Similar results to those in Example 1 were obtained.

EXAMPLE 3

Example 1 was repeated except that the same urethane diamine as in Example 1 was used, polyoxyethylene lauryl ether having an HLB of 13 or polyoxyethylene nonylphenyl ether having an HLB of 12.4 or 14.5 was used as the emulsifier, and the pH of the aqueous dispersion was adjusted to 8.9. All of the aqueous dispersions obtained remained stable after a lapse of 30 days.

COMPARATIVE EXAMPLE 2

Example 1 was repeated except that the same urethane diamine as in Example 1 but having a molecular weight of 5,300 was used, various polyoxyethylene nonylphenyl ethers with an HLB of 5 to 20 were used as the emulsifier, and the pH of the aqueous dispersion was adjusted to 8.8–10.5. All of the aqueous dispersions obtained showed phase separation within half a day.

EXAMPLE 4

Example 1 was repeated except that the same urethane diamine as in Example 1 was used, polyoxyethylene nonylphenyl ether having an HLB of 13 was used as the emulsifier, and the pH of the aqueous dispersion was adjusted to 9.8, 9.5, 8.9, 8.5 or 8.2 respectively. All of the aqueous dispersions obtained remained stable after a lapse of 30 days.

COMPARATIVE EXAMPLE 3

Example 1 was repeated except that the pH of the aqueous dispersion was adjusted to 8.9, and each of the following emulsifiers was used (the parenthesized numbers indicate HLB values).
Polyoxyethylene cetyl ether (14.2),
polyoxyethylene steraryl ether (13.1),
polyoxyethylene oleyl ether (16.2),
sorbitan monolaurate (8.1),
sorbitan monooleate (5.1),
polyoxyethylene sorbitan monostearate (14.9),
polyoxyethylene sorbitan monooleate,
polyethylene glycol monolaurate (13.7),
polyethylene glycol monostearate (13.4),
polyethylene glycol monooleate (11.5 or 13.4),
polyoxyethylene polyoxypropylene glycol (molecular weight, about 1,250; Nissan Pronon 102, a trademark for a product of Nihon Yushi K.K.),
polyethylene glycol (molecular weight, about 2,000),
nonionic polyoxyethylene alkyl (cream)amine (Nissan Nimine T$_2$-210),
a higher alcohol sulfate ester salt as an anionic surfactant (Nissan Synthrex LD-40, a product of Nihon Yushi K.K.),
potassium soap,
a sulfonic acid salt of a dibasic fatty acid ester (Nissan Rapizol B-30, a product of Nissan Yushi K.K.),
a quaternary ammonium salt as a cationic surfactant (Nissan Cation ABT, a product of Nihon Yushi K.K.), and betain-type dimethyl alkyl (coconut) betain as an amphoteric surfactant (Nissan Anon BF, a product of Nihon Yushi K.K.).

All of the aqueous dispersions obtained had very poor stability, and showed phase separation within one hour.

EXAMPLE 5

An aqueous dispersion was prepared in the same way as in Example 1 from 100 parts by weight of the same urethane diamine as in Example 1 but having a molecular weight of 9,500, 2 parts by weight of polyoxyethylene nonylphenyl ether having an HLB of 13, 78 parts by weight of water, 22 parts by weight of a 0.2 N aqueous solution of HCl, and 50, 80, 160 or 200 parts by weight of untreated calcium carbonate. Even after a lapse of 7 days, they did not develop phase separation.

EXAMPLE 6

To 100 parts by weight of the same urethane diamine as in Example 1 but having a molecular weight of 9,300 was added polyoxyethylene nonylphenyl ether having an HLB of 13 in an amount of 0.5, 10.0, 15.0 or 20.0 parts by weight. The pH of the mixture was adjusted to 8.6, and aqueous dispersions were prepared in the same way as in Example 1. All of the resulting aqueous dispersions remained stable after a lapse of 30 days.

EXAMPLE 7

Two parts by weight of polyoxyethylene nonylphenyl ether having an HLB of 13 as an emulsifier was added to 100 parts by weight of the same urethane diamine as in Example 1, and the pH of the solution was adjusted to 8.7. Then, water was added in an amount of 50, 150, 200 or 250 parts by weight and aqueous dispersions were prepared in the same way as in Example 1. All of the resulting aqueous dispersions remained stable after a lapse of 30 days.

EXAMPLE 8

An aqueous dispersion (A) was prepared from 100 parts by weight of a urethane diamine having a molecular weight of 9,500, 80 parts by weight of calcium carbonate, 78 parts by weight of water, 22 parts by weight of a 0.2 N aqueous solution of HCl and 2 parts by weight of polyoxyethylene nonylphenyl ether having an HLB of 13.

Separately, a flask fitted with a stirrer having three-propeller blades was charged with 100 parts by weight of an epoxy resin (Epomix R-140, a trademark for a product of Mitsui Petrochemical Industries, Ltd.) and 3 parts of an emulsifier (Nissan Pronon 208, a trademark for a product of Nihon Yushi K.K.), and the mixture was stirred for 5 minutes at 60° C. at a speed of 500 rpm. With continued stirring at 500 rpm, 10 parts by weight of a 5% aqueous solution of polyvinyl alcohol (KH-17, a trademark for a product of Nihon Gosei Kagaku Kogyo K.K.) was added dropwise. Subsequently, 87 parts by weight of water was added in small portions over the course of about 10 minutes. The mixture was stirred further for 10 minutes, and cooled to form an aqueous dispersion of epoxy resin (B). The resulting aqueous dispersion (B) remained stable for more than 6 months.

100 Parts by weight of (A) and 5.7 parts by weight of (B) were mixed, coated on a glass sheet, and cured at room temperature for 2 weeks to form a sheet. The resulting cured sheet had the following properties.

| | |
|---|---|
| Tensile strength (JIS A6021): | 23 kg/cm$^2$ |
| Elongation (JIS A6021): 400% | |
| Shore A hardness: 58 | |
| Tensile shear adhesion strength (JIS K6850, adherend, an iron plate; no primer applied): | 9 kg/cm$^2$ |

EXAMPLE 9

A cured sheet was prepared in the same way as in Example 8, and its resistance to chemicals was examined in accordance with JIS A6021. The results are shown in Table 2.

Table 2

| Resistance to | Chemicals used | Retention of tensile stress at break (%) | Retention of elongation at break (%) |
|---|---|---|---|
| Alkali | 0.1% NaOH aq. sol. | | |
| | saturated with Ca(OH)$_2$ | 110 | 90 |
| Acid | 2% sulfuric acid aq. sol. | 70 | 100 |
| Saline solution | Saturated aqueous solution of NaCl | 100 | 100 |
| Water | Distilled water | 90 | 90 |
| Solvent | Kerosene | 100 | 95 |
| Solvent | Acetone | 140 | 95 |
| Solvent | Crude oil occurring in Arabia | 90 | 120 |

The sample was dipped in each of the test chemicals at 20° C. for 7 days. The retention is the percentage of the value after dipping as against the value before dipping.

EXAMPLE 10

A cured sheet was prepared in the same way as in Example 8, and was subjected to an accelerated sunlight exposure test using a Sunshine Weather-Ometer in accordance with JIS A1415 (WS type). Then, the sample was subjected to a tensile test in accordance with JIS K6301 to examine its weatherability. The results are shown in Table 3.

Table 3

| Exposure time (hours) | Retention of tensile stress at break (%) | Retention of elongation at break (%) |
|---|---|---|
| 100 | 100 | 110 |
| 200 | 98 | 100 |
| 500 | 95 | 97 |
| 1000 | 80 | 95 |

The retention is the percentage of the value after exposure as against the value before exposure.

EXAMPLE 11

A mixture of the aqueous dispersions (A) and (B) prepared in Example 8 was applied to each of the various adherends shown in Table 4 without applying a primer. The adhesion strength of each coated film was measured by a 180° peeling test at a pulling speed of 50 mm/min. The sample had a thickness of 1.5 mm, and the area of adhesion was 25 mm × 150 mm. The results are shown in Table 4.

Table 4

| Adherend | Adhesion strength (kg/cm) | Remarks |
|---|---|---|
| Mortar | 2.9 | Cohesive destruction |
| Slate | 2.6 | Cohesive destruction |
| Untreated aluminum | 2.5 | Cohesive destruction |
| Polyurethane-coated aluminum | 2.6 | Cohesive destruction |
| Iron | 2.6 | Cohesive destruction |
| Glass | 2.4 | Cohesive destruction |
| Plywood | The adherend was destroyed. | — |

EXAMPLE 12

A mixture of the aqueous dispersions (A) and (B) prepared in Example 8 was applied to a mortar substrate, and the adhesion strength of the coating after immersion in water at 20° C. for 10 days and the adhesion durability of the coating were examined in accordance with JIS A6910. The adhesion durability of the coating is the adhesion strength of the coating measured after subjecting the sample ten times to a cooling-heating cycle consisting of immersion in water at 20° C. for 18 hours, then allowing it to stand at 20° C. for 3 hours, and then maintaining it at 50° C. for 3 hours.

Table 5

| | Adhesion strength (kg/cm$^2$) |
|---|---|
| Reference | 9.6 |

Table 5-continued

| | Adhesion strength (kg/cm$^2$) |
|---|---|
| After immersion in water at 20° C. for 10 days | 9.4 |
| Adhesion durability | 8.0 |

EXAMPLE 13

A mixture of ordinary portland cement, standard sand taken at Toyoura, Japan and water in a ratio of 1:2:0.65 was poured into a wooden mold which had been water-proofed. A woven straw sheet was put over the mixture, and water was applied to it to maintain the mixture always in the wet state. After a predetermined number of days, a mortar block (70×70×50 mm) was taken out, and a mixture of dispersions (A) and (B) used in Example 8 was sprayed onto the 70×70 mm surface of the mortar block in the wet state to a thickness of about 1.5 mm (on drying). The adhesion strength was measured 20 days after spraying. The measurement was performed in accordance with JIS A6910 (laminate with a decorative design sprayed onto it), and the peel speed was 1 mm/min.

The results are shown in Table 6.

Table 6

| Number of days that elapsed after spraying | Adhesion strength (kg/cm$^2$) |
|---|---|
| 1 | 2.6 |
| 2 | 4.1 |
| 4 | 9.1 |
| 5 | 9.6 |
| 7 | 7.3 |
| 10 | 6.7 |
| 13 | 8.2 |
| Reference* | 8.0 |

*A dried slate was used as an adherend. In this case, the adherend was destroyed.

What we claim is:

1. An aqueous dispersion having a pH of about 7 to about 10.5 and comprising
    (A) a urethane diamine having a molecular weight of about 5,500 to about 25,000 and expressed by the formula

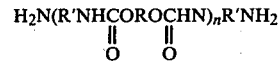

wherein R is a residual moiety of a long-chain diol having a molecular weight of about 500 to about 15,000, R' is a divalent hydrocarbon radical, and n is an integer of 1 to 25,
    (B) about 0.5 to about 20 parts by weight, per 100 parts by weight of the urethane diamime (A), of a polyoxyethylene ether as an emulsifier having a hydrophilic-lipophilic balance of about 11 to about 16 and selected from the group consisting of polyoxyethylene aryl ethers and polyoxyethylene lauryl ether,
    (C) about 50 to about 300 parts by weight, per 100 parts by weight of the urethane diamine (A), of water,
    (D) an acid as a pH adjusting agent in an amount sufficient to adjust the pH of the aqueous dispersion to about 7 to about 10.5, and
    (E) a filler in an amount which is within the range of 0 to about 300 parts by weight per 100 parts by weight of the urethane diamine (A) and which does not cause phase separation of the aqueous dispersion.

2. The aqueous dispersion of claim 1 wherein the polyoxyethylene ether (B) has a hydrophilic-lipophilic balance of about 12.5 to about 14.5 and is selected from the group consisting of polyoxyethylene aryl ethers and polyoxyethylene lauryl ether.

3. The aqueous dispersion of claim 1 wherein in the formula expressing the urethane diamine (A), R is a residual moiety of a long-chain diol having a molecular weight of about 1,000 to about 12,000.

4. The aqueous dispersion of claim 1 wherein the urethane diamine (A) has a molecular weight of about 7,000 to about 20,000.

5. The aqueous dispersion of claim 1 wherein in the formula expressing the urethane diamine (A), R' is a divalent hydrocarbon group selected from the class consisting of C$_2$ to C$_{12}$ alkylene groups, C$_6$ to C$_{14}$ cycloalkylene groups and C$_6$ to C$_{14}$ arylene groups.

6. The aqueous dispersion of claim 1 which has a pH value of about 8 to about 10.2.

* * * * *